(12) United States Patent
Rasmussen et al.

(10) Patent No.: US 6,502,146 B1
(45) Date of Patent: Dec. 31, 2002

(54) APPARATUS AND METHOD FOR DEDICATED INTERCONNECTION OVER A SHARED EXTERNAL BUS

(75) Inventors: Norman J. Rasmussen, Hillsboro, OR (US); Brad W. Hosler, Portland, OR (US); Darren Abramson, Folsom, CA (US); Michael J. McTague, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/537,087

(22) Filed: Mar. 29, 2000

(51) Int. Cl.[7] .............................................. G06F 13/00
(52) U.S. Cl. ........................ 710/100; 710/63; 710/313
(58) Field of Search ................................ 710/100, 313, 710/63

(56) References Cited

U.S. PATENT DOCUMENTS

| 5,276,443 A | | 1/1994 | Gates et al. ............ 340/825.06 |
| 5,859,993 A | * | 1/1999 | Snyder ........................ 712/208 |
| 5,958,020 A | * | 9/1999 | Envoy et al. ................... 710/3 |
| 6,272,644 B1 | * | 8/2001 | Urade et al. ................. 713/320 |

FOREIGN PATENT DOCUMENTS

| DE | 43 01 117 | 8/1993 |
| EP | 0 669 583 | 8/1995 |
| WO | WO 00/00900 | 1/2000 |

OTHER PUBLICATIONS

Universal Serial Bus System Architecture, Don Anderson (MindShare, Inc.), Chapter 6, "USB Transfers", pp. 71–82, Addison–Wesley, Nov. 1999.
International Preliminary Examination Report, PCT/US01/07224, International Filing Date Mar. 06, 2001; Priority Date Mar. 20, 2002; Applicant: Intel Corporation.

* cited by examiner

Primary Examiner—Peter Wong
Assistant Examiner—Tim Vo
(74) Attorney, Agent, or Firm—Kenyon & Kenyon

(57) ABSTRACT

Apparatus and methods to control an external bus. In one embodiment, an apparatus includes an external bus port and an external bus controller. The external bus controller can include a first register interface to receive a first set of data and a second register interface to receive a second set of data. The external bus controller can send the first set of data and the second set of data to said external bus port.

25 Claims, 2 Drawing Sheets

APPARATUS AND METHOD FOR DEDICATED INTERCONNECTION OVER A SHARED EXTERNAL BUS

FIELD OF THE INVENTION

Embodiments of the present invention relate to communications over an external computer bus. More particularly, embodiments of the present invention relate to a dedicated interconnection over a shared external computer bus.

BACKGROUND OF THE INVENTION

Known computers include a serial port that can provide a dedicated connection to a peripheral. For example, to transfer data to the peripheral, a processor of the computer can send data over the internal input/output ("I/O") bus to a Universal Asynchronous Receiver/Transmitter ("UART") at a serial port address. The computer's UART serializes the data and sends data bits one at a time over a serial communications link (e.g., a wire, a serial cable) coupled to the UART. The term "coupled" encompasses a direct connection, an indirect connection, etc. The peripheral at the other end of the serial communications link includes a UART that receives the data. A UART-based serial port is typically coupled to a single peripheral device.

Computers may include Universal Serial Bus ("USB") root hub including one or more USB host ports. A USB host port can be coupled to a plurality of USB peripheral devices ("USB target devices") over a serial communication link. Each USB target device can be assigned a device address by the USB host (e.g., the software and hardware of the computer that supports the USB). The USB host can include a USB driver that knows the device address of each USB target device. Each USB target device can have a corresponding device driver that communicates with the USB driver to perform data transfers to and from the USB target device.

When a device driver is to transfer data to or from a USB target device, it sends the USB driver an I/O Request Packet ("IRP") to request initiation of the data transfer. A single USB target device cannot typically perform an entire block transfer of data across the USB at one time, however, because the USB is a shared bus (i.e., many USB target devices typically can use the same bus at the same time). Accordingly, a data transfer is typically divided into segments (e.g., transactions) that are transferred during successive time periods (e.g., frames). By parsing data transfers into transactions, the USB host can ensure that a portion of the USB bandwidth can be devoted to other USB target devices. In view of the foregoing, it can be appreciated that a substantial need exists for methods and apparatus which can advantageously provide a dedicated interconnection over a shared computer bus.

DETAILED DESCRIPTION

Methods and apparatuses in accordance with embodiments of the present invention can advantageously provide a dedicated interconnection over a shared external computer bus. According to an embodiment of the present invention, a shared external bus controller can include a first register interface and a second register interface. The first register interface can receive a first set of data, and the second register interface can receive a second set of data. The external bus controller can send the first set of data and the second set of data to a shared external bus port.

Figure 1:
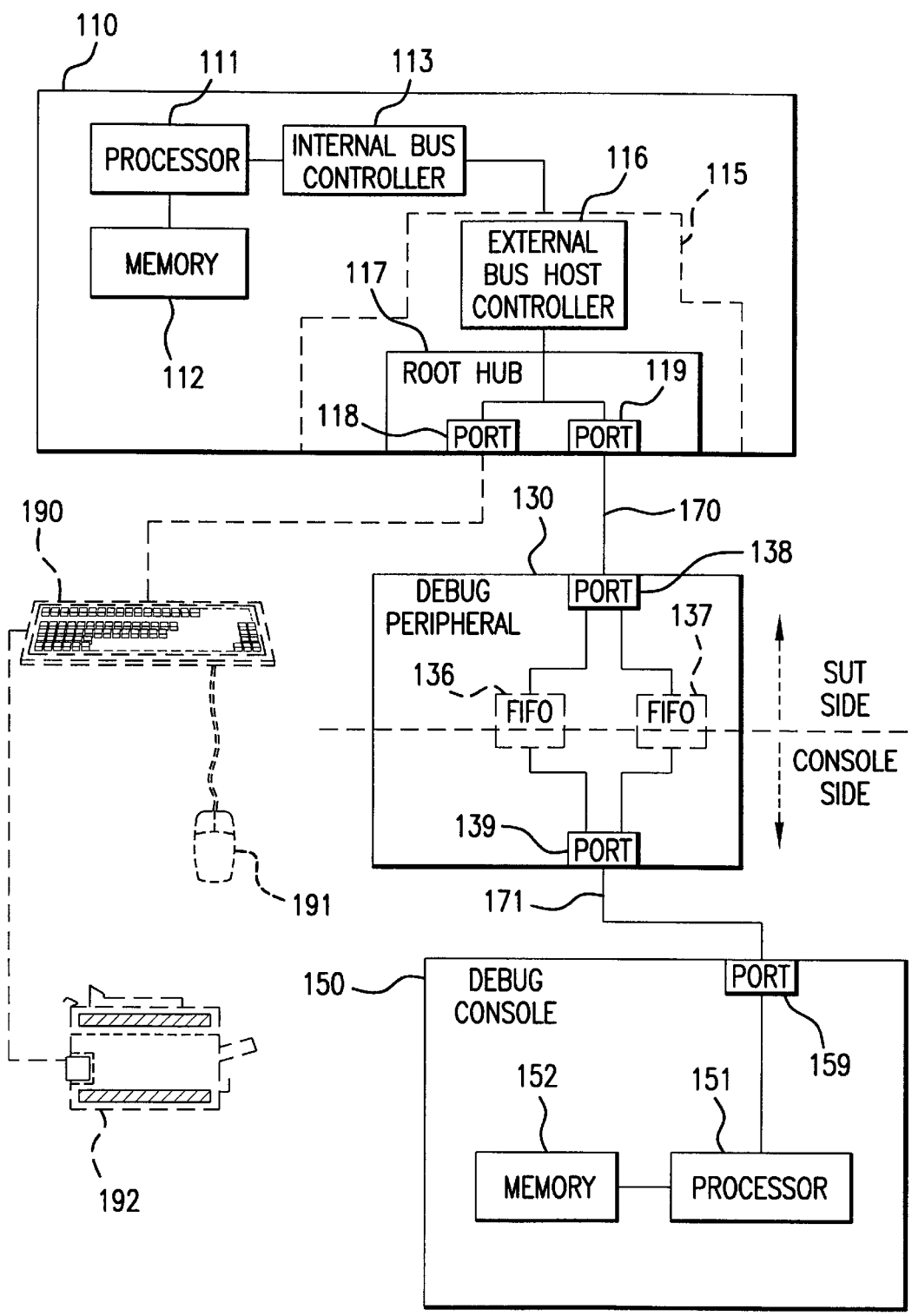
FIG. 1 shows a system in accordance with an embodiment of the present invention.

FIG. 1 shows a system in accordance with an embodiment of the present invention. A computer 110 can include a processor 111 coupled to a memory 112. In one embodiment of the present invention, processor 111 is a Pentium® III processor manufactured by Intel Corp. of Santa Clara, Calif. (Pentium® is a registered trademark of Intel Corp.). Processor 111 can be coupled to an internal bus controller 113. The internal bus controller 113, in one embodiment, is a Peripheral Component Interconnect (PCI) internal bus controller. In another embodiment, the internal bus controller 113 includes a plurality of bus controllers (e.g., a Northbridge chip and a Southbridge chip, a front-side bus controller and a back-side bus controller, a memory bus controller and an I/O bus controller, etc.).

An external bus host 115 can be coupled to internal bus controller 113. The external bus host 115 can include an external bus host controller 116. In one embodiment of the present invention, the external bus host 115 is a USB host (e.g., the software and hardware of a system that supports a USB), and the USB host includes a USB host controller. In another embodiment of the present invention, the external bus host 115 is a shared external bus host (e.g., the software and hardware of a system that supports a shared external bus). A shared external bus, in one embodiment, can provide communications for a plurality of devices that typically can use the same bus at generally the same time (e.g., data is communicated via packets, via a time-division multiple access protocol, a code-division multiple access protocol, a frequency-division multiple access protocol, etc.). External bus host controller 116 can be coupled to root hub 117, and root hub 117 can include a port 118 and a port 119. In one embodiment, root hub 117 can be a USB root hub, and each of ports 118, 119 can be a USB host port.

In one embodiment of the present invention, the external bus host controller 116 is coupled to an external bus port via an external bus port output of the external bus host controller 116. In another embodiment of the present invention, an external bus host controller is included in an internal bus controller (e.g., a PCI bus controller including a USB host controller, etc.).

Computer 110 can include an external bus host controller driver. In one embodiment, the external bus host controller driver includes instructions to be executed by processor 111. The external bus host controller driver can be stored on a computerreadable medium such as memory 112 (e.g., Dynamic Random Access Memory (DRAM), Rambus® DRAM (RDRAM), Static Random Access Memory (SRAM), flash memory, a hard disk, an optical disk, a magneto-optical disk, a Compact Disc Read Only Memory (CD-ROM), a Digital Versatile Disc (DVD), non-volatile memory, a combination thereof, etc.). In one embodiment, the external bus host controller driver can include a plurality of drivers (e.g., an external bus driver and an external bus host controller driver, etc.). In another embodiment, the external bus host controller driver can include a USB driver and a USB host controller driver.

In accordance with one embodiment of the present invention, external bus host controller 116 includes a standard register interface and standard interface logic. The standard register interface and standard interface logic can send data to, and receive data from, one or more standard device drivers. Examples of standard device drivers include a keyboard device driver, a mouse device driver, a printer device driver, etc. The keyboard device driver can receive data from, and send data to, a keyboard 190 via the standard register interface and the standard register interface logic. The mouse device driver and printer device driver respectively can receive data from, and send data to, a mouse 191 and a printer 192 via the standard register interface and the standard register interface logic. For example, in one embodiment, the standard register interface and standard register interface logic can schedule transactions to be broadcast over the USB. The transactions can be scheduled via a series of transaction lists, and each transaction list can include one or more transaction targeted for one or more of the devices coupled to the external bus.

External bus host controller 116 can include a dedicated register interface and dedicated interface logic. In one embodiment of the present invention, computer 110 is a system under test executing system under test ("SUT") debug software, the dedicated register interface can comprise a debug port register interface, and the dedicated interface logic can comprise a debug port interface logic. Examples of a system under test include a computer, a computer motherboard, a computer system board, a processor board, a computer motherboard coupled to one or more input/output devices (e.g., a keyboard, a video card, a monitor, a mouse, a USB device, a network interface card, etc.). SUT debug software can include instructions to determine the functionality of system components, instructions to trace system operations, instructions to communicate debug data to a debug console, etc.

A system under test (e.g., computer 110) can be coupled to a debug console 150 via a shared external bus link 170, a debug peripheral 130, and a shared external bus link 171. In one embodiment, debug console 150 comprises a computer including a processor 151 and memory 152. The debug console 150 can include an shared external bus port 159. In one embodiment, the shared external bus port 159 is a USB port of a USB host. In another embodiment of the present invention, the shared external bus port 159 is at least of portion of a shared external bus host. The debug console 150 can execute debug console debug software that can communicate via debug peripheral 130 with the SUT debug software being executed on a system under test.

The debug peripheral 130 can be coupled to the computer 110 and the debug console 150 via external bus link 170 and external bus link 171 respectively. In one embodiment, each of external bus links 170, 171 comprise a USB cable. In another embodiment, each of external bus links 170, 171 comprise a communications link over which a shared external bus can communicate (e.g., a cable, a communications path, a wireless communications path, etc.). Debug peripheral 130, in one embodiment can have shared external bus target ports 138, 139. In one embodiment, each of shared external bus target ports 138, 139 are an independent USB target port, and the USB target ports are coupled via FIFO buffers (first-in, first out buffers) 136, 137. In another embodiment, two independent USB interfaces are connected internally as two FIFO buffers. One FIFO buffer can act as a write buffer for debug console 150 and the read buffer for computer 110, and the other FIFO buffer can act as the read buffer for the debug console 150 and as the write buffer for the computer 110. In one embodiment, each FIFO can be eight bytes. In another embodiment, each FIFO can be larger than eight bytes, but the USB interface to the each FIFO can only provide a maximum of 8 bytes of data per read request.

The debug console side (console side) of the debug peripheral 130, in one embodiment, is implemented according to the USB specification. A standard USB driver can be used to access the console side of the peripheral. The system under test side (SUT side) of the debug peripheral can be implemented according to the USB specification with certain exceptions. In one embodiment, the SUT side can come out of reset enabled and can respond to accesses that address it. The default address can be a fixed address. In one embodiment, whereas a typical USB device has an address assigned to it by a USB host, the SUT side default address is 7Fh with an endpoint of 01h.

According to an embodiment of the present invention, computer 110 can be a system under test that executes SUT debug software. The SUT debug software executing on computer 110 can communicate via debug peripheral 130 with debug console debug software executing on the debug console 150. The debug communications (e.g., data sent from computer 110 to debug console 150, data sent from debug console 150 to computer 110) can be carried via a dedicated and unobtrusive portion of the shared external bus (e.g., a USB bus) whether or not standard communications are being broadcast over the shared external bus (e.g., communications to a keyboard, a mouse, a printer, etc.).

Figure 2:
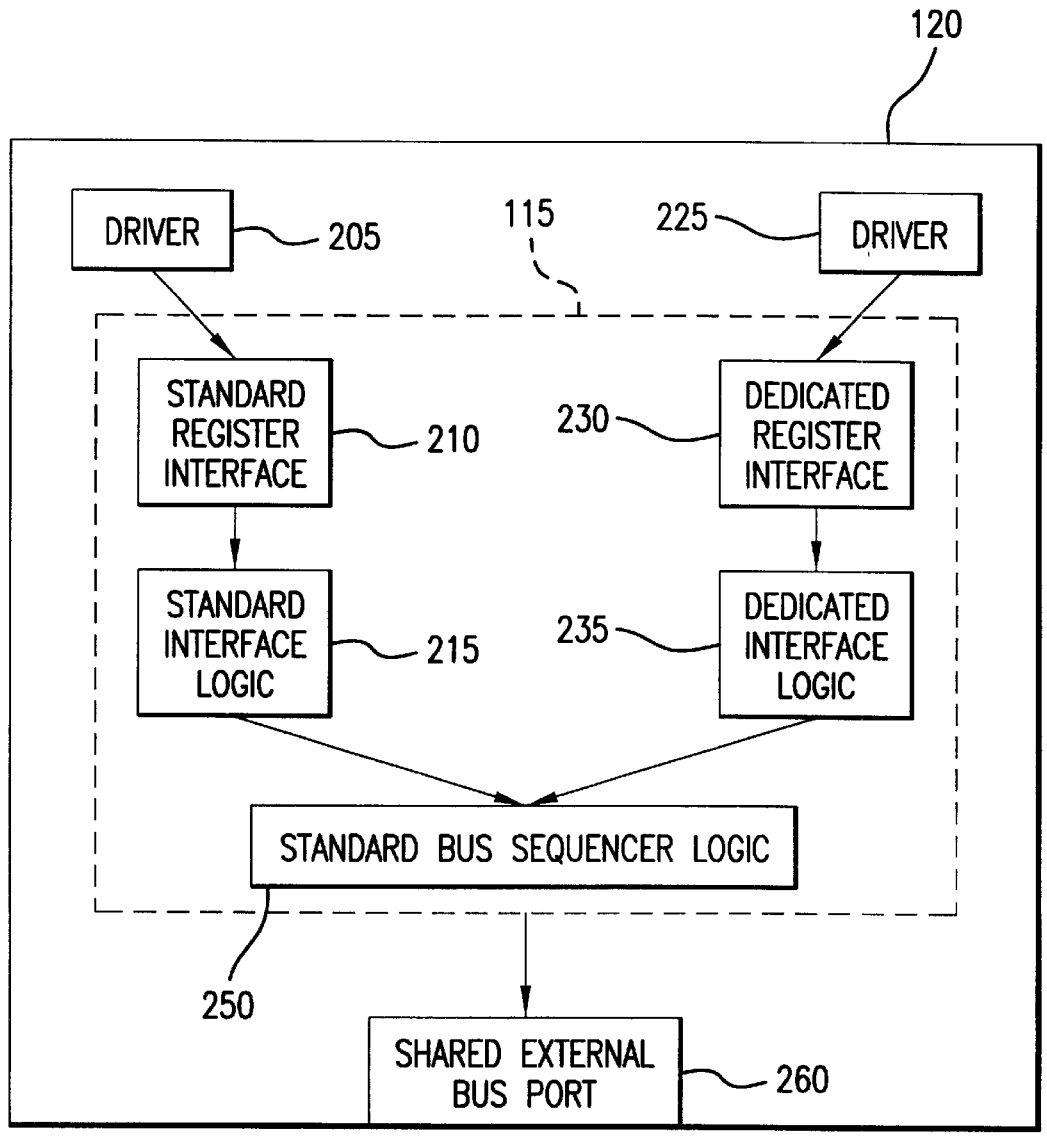
FIG. 2. shows an apparatus in accordance with an embodiment of the present invention.

FIG. 2. shows an apparatus in accordance with an embodiment of the present invention. Computer 200 can include a shared external bus host 201, and the shared external bus host 201 can include a dedicated register interface 230 and dedicated interface logic 235. In one embodiment, the dedicated register interface 230 comprises a debug port register interface, and the dedicated interface logic 235 comprises debug port interface logic. The shared external bus host 201 can include a standard register interface 210 and standard interface logic 215. In one embodiment of the present invention, the standard register interface 210 and standard interface logic 215 can implement communications between one or more drivers 205 (e.g., a device driver, input/output device drivers, etc.) and standard shared bus peripherals (e.g., USB peripherals, etc.) coupled to the shared external bus port 260 (e.g., a USB host port, etc.).

Standard bus sequencer logic 250 can receive data to be transmitted to the shared external bus port 260 from standard register interface 210 and/or dedicated register interface 230. In one embodiment, the standard register interface 210 comprises a standard USB register interface of a USB host controller. The standard USB register interface can receive data from a standard USB driver and USB host controller driver. A USB transaction list of transactions can be generated, and the transactions can be sent to a standard USB bus sequencer for transmission to a USB host port. In one embodiment of the present invention, the dedicated register interface 230 and the dedicated interface logic 235 can receive data sent by driver 225 (e.g., a software driver, a debug software driver, etc.). Data received from the dedicated register interface 230 (e.g., debug data traffic) can be sent to the standard bus sequencer logic 250 for transmission to the shared external bus port 260.

A shared external bus host 201 including the dedicated register interface 230 and the dedicated interface logic 235, in one embodiment, can operate in at least three modes. A first mode of operation can encompass transmission of data via the dedicated register interface 230 and the shared external bus when the standard register interface 210 and the standard interface logic 215 are not able to transmit data to the shared external bus port 260. For example, the status of computer 200 can be such that the standard interface logic 215 views the shared external bus port 260 as in a disabled state. A second mode of operation can encompass transmission of data via the dedicated register interface 230 and the shared external bus when the standard register interface 210 and the standard interface logic 215 are operational (i.e., configured to transmit data via the shared external bus port 260). In either of the first mode of operation and the second mode of operation, in one embodiment, at least a set amount of data received from the dedicated register interface can be transmitted to the shared external bus port 260 and over a shared external bus. For example, in one embodiment, when the shared external bus is a USB, the dedicated port is able to send at least 8 bytes of data received via the dedicated register interface during each frame transmitted over the USB (e.g., at least 8 bytes every 1 millisecond, etc.). In another embodiment, a shared external bus host can control the operation of a shared external bus so that the bandwidth of the shared external bus includes at least a minimum amount of bandwidth (e.g., 8 bytes per period, 16 bytes per period, 256 bytes per period, 1 kbyte per period, etc.) for data received via the dedicated register interface. The remainder of the bandwidth of the shared external bus can be for data received via the standard register interface. In a third mode of operation, the dedicated register interface 230 and the dedicated interface logic 235 is not enabled and not able to transceive data via the shared external bus port 260 and the shared external bus.

In one embodiment in accordance with a USB system, a debug peripheral coupled to the USB can suspend unless it receives appropriate data within a certain period of time. In a first mode of operation (e.g., when the standard register interface is disabled and the dedicated register interface enabled), the shared external bus host can periodically generate (e.g., every 2 milliseconds, etc.) a "keepalive" packet to keep the attached debug peripheral from suspending. In one embodiment, the keepalive packet can be a standalone 32-bit SYNC field (i.e., a binary representation of KJKJKJKK). In a second mode of operation (e.g., when the standard register interface and the dedicated register interface are enabled), the normal transmission of SOF (Start of Frame) packets (i.e., a packet identifier and a frame number) can keep the attached debug peripheral from suspending. In one embodiment, in either the first mode of operation or the second mode of operation, the external bus host can check for software requested dedicated register interface data transactions at least every 125 microseconds.

In accordance with one embodiment of the present invention, a system under test includes a shared external bus host, and the shared external bus host includes at least a standard register interface for shared communications over the shared external bus and a dedicated register interface for dedicated communications over the shared external bus. The shared external bus, in one embodiment, is a USB. In another embodiment, the shared external bus is an IEEE 1394 bus, a local area network, a wireless communication path, a wireless local area network, etc. The shared external bus host can include a host port in communication with a debug console. In one embodiment, the debug console can include a target port. In another embodiment, the host port of the system under test is in communication with the debug console via a debug peripheral. The debug peripheral can include a pair of target ports, the first target port being in communication with the system under test host port, and the second target port being in communication with a host port of the debug console.

The system under test can come out of reset and include instructions (e.g., software, firmware, hardwired instructions, etc.) to locate a device that supports the dedicated register interface and to determine the address of the dedicated register interface. In one embodiment, such instructions are included in system under test debug software. In another embodiment, such instructions are at least part of a system BIOS (basic input/output subsystem), an operating system, a software application, a software driver, etc. In one embodiment, the dedicated register interface is located in an entry in a PCI Capability, and the entry includes address information relating to where the dedicated register interface resides. The instructions can then determine whether a debug peripheral is present. For example, the debug peripheral can come out of reset enabled, can have a fixed address, and can respond to accesses that address it.

The system under test can communicate via the dedicated register interface and the shared external bus with the debug console (with or without the debug peripheral). The system under test can communicate via the dedicated register interface whether or not the standard port is operational. For example, in one embodiment, the system under test can come out of reset and the instructions to establish communications via the dedicated register interface over the shared external bus can be executed prior to execution of instructions to establish communications via the standard port. In such an embodiment, data communicated over the shared external bus via the dedicated register interface can be the only data traffic carried by the shared external bus. In another embodiment, the system under test can execute the instructions to establish communications via the standard port over the shared external bus can be executed prior to execution of instructions to establish communications via the dedicated register interface. In such an embodiment, data communicated over the shared external bus via the dedicated register interface can be interspersed with data traffic communicated over the shared external bus via the standard port.

In accordance with an embodiment of the present invention, computer 200 can include software to determine whether the shared external bus host (e.g., a USB host, etc.) includes a dedicated register interface for data transmission over the shared external bus host by accessing the PCI Capability List (the PCI Capability List is defined in the PCI Local Bus Specification (Section 6.7 Capability List, Rev. 2.2, Dec. 18, 1999). In one embodiment, the dedicated port can be located by accessing each PCI device and determining if bit 4 in the status register is set. When bit 4 is cleared, then the current device does not support the PCI Capability List and the software can move to the next device (or function). When bit 4 is set, the software can read an offset (e.g., offset 34h) of the device's configuration space. This byte field can be used as a pointer to the first entry in the capability list. The software can read the first Dword (doubleword) of the first entry. Byte 0 is the capability ID, and in one embodiment, when it is equal to a set value (e.g., 0Ah), then a dedicated register interface (e.g., a debug register interface) has been located. When the value is not that set value (e.g., 0Ah), the software can determine if byte 1 is zero. When byte 1 is zero, the device (or function) includes no additional capabilities in the list, and the software can access the next device (or function). When byte 1 is non-zero, the software can use byte 1 as a pointer to the next capability in the list.

After software has determined that a device supports the dedicated register interface, it can find the address where a control register and data buffer are located. The software can find that information in byte 2 and byte 3 of the entry in the capability list. Byte 2 can indicate which base address register (BAR) is used to map the dedicated register interface registers into the address space when memory BARs are supported. In one embodiment, the software can determine the type of BAR (e.g., 32 bit, 64 bit, etc.) that can be used to determine the actual address of the dedicated register interface. Byte 3 can indicate to software how far (e.g., up to 4K) into the address space the registers are mapped. In one embodiment of the present invention, the shared external bus is a USB bus, and after the dedicated register interface registers have been located, the Link ID is determined and the Link Specific field (if applicable) is initialized.

In accordance with one embodiment of the present invention, instructions adapted to be executed by a processor to perform a method are stored on a computerreadable medium. The computer-readable medium can be a device that stores digital information. For example, a computer-readable medium includes a ROM as is known in the art for storing software (e.g., microcode). The computer-readable medium can be accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Methods and apparatus in accordance with embodiments of the present invention can advantageously provide a dedicated communication connection to a peripheral. In accordance with one embodiment of the present invention, a shared external bus controller includes a standard register interface and a dedicated register interface. The shared external bus controller can send data received from the standard register interface and the dedicated register interface over a shared external bus. The shared external bus controller can send up to a first amount of data during each time period of the plurality of time period (e.g., up to 1500 bytes during each frame of successive USB frames). When the shared external bus controller receives data via the dedicated register interface, at least a second amount of data received from the dedicated register interface can be included within the up to a first amount of data sent during each time period of the plurality of time periods (e.g., at least 8 bytes during each frame of successive USB frames). In one embodiment of the present invention, such communication of data received via the dedicated register interface can enable communications between a system under test and a debug console.

Embodiments of methods and apparatus to provide a dedicated interconnection over a shared computer bus have been described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

We claim:

1. An apparatus to control an external bus, the apparatus comprising:

an external bus controller including a first register interface to receive a first set of data and a second register interface to receive a second set of data; said external bus controller to send the first set of data and the second set of data to an external bus port output; the external bus controller to send to said external bus port up to a first amount of data within each time period of a plurality of time periods; the up to a first amount of data including an at least a second amount of data, each at least second amount of data to be received from the second register interface.

2. The apparatus of claim 1, wherein the up to a first amount of data includes up to a third amount of data, each up to a third amount of data to be received from the first register interface.

3. The apparatus of claim 1, wherein the external bus controller comprises a shared external bus controller.

4. The apparatus of claim 1, wherein:
the first register interface includes a standard register interface; and
the second register interface includes a dedicated register interface.

5. The apparatus of claim 1, wherein:
the first register interface is to communicate with a plurality of external bus device drivers; and
the second register interface is to communicate with a first driver.

6. The apparatus of claim 1, wherein said external bus controller includes a Universal Serial Bus ("USB") host controller.

7. The apparatus of claim 6, wherein:
the first register interface includes a standard USB register interface and standard USB interface logic; and
the second register interface includes a dedicated register interface and dedicated interface logic.

8. The apparatus of claim 6, wherein:
the first register interface includes a standard USB register interface and standard USB interface logic; and
the second register interface includes a debug port register interface and debug port interface logic.

9. The apparatus of claim 6, wherein said external bus controller further includes a USB driver and a USB host controller driver.

10. The apparatus of claim 9, wherein the up to a first amount of data includes an at least a second amount of data within each frame, each at least a second amount of data to be received from the second register interface.

11. The apparatus of claim 10, wherein the up to a first amount of data includes an up to a third amount of data within each frame, each up to a third amount of data to be received from the first register interface.

12. A method of transmitting data over a dedicated portion of a bandwidth of a shared external bus, the method comprising:
receiving a first set of data from a first register interface;
receiving a second set of data from a second register interface;
sending up to a first amount of data within each time period of a plurality of time periods, each up to a first amount of data including at least a second amount of data, each at least a second amount of data received from the second register interface.

13. The method of claim 12, wherein each up to a first amount of data includes an up to a third amount of data, each up to a third amount of data received from the first register interface.

14. The method of claim 12; wherein:
receiving a first set of data from a first register interface includes receiving data from a plurality of external bus device drivers; and
receiving a second set of data from a second register interface includes receiving data from a first driver.

15. The method of claim 12, wherein sending up to a first amount of data within each time period of a plurality of time periods includes sending up to a first amount of data within each time period of a plurality of time periods to a debug console, the debug console executing debug console debug software.

16. The method of claim 12, wherein each time period of a plurality of time periods comprises each Universal Serial Bus ("USB") frame of a plurality of USB frames.

17. The method of claim 14, wherein the plurality of external bus device drivers comprise Universal Serial Bus device drivers.

18. A computer-readable medium storing a plurality of instructions to be executed by a processor to transmit data over a dedicated portion of a bandwidth of a shared external bus, the plurality of instructions comprising instructions to:
receive a first set of data from a first register interface;
receive a second set of data from a second register interface;
send up to a first amount of data within each time period of a plurality of time periods, each up to a first amount of data including at least a second amount of data, each at least a second amount of data received from the second register interface.

19. The computer-readable medium of claim 18, wherein each up to a first amount of data includes an up to a third amount of data, each up to a third amount of data received from the first register interface.

20. The computer-readable medium of claim 18, wherein:
receiving a first set of data from a first register interface includes receiving the first set of data from a plurality of Universal Serial Bus device ("USB") drivers;
receiving a second set of data from a second register interface includes receiving the second set of data from a first USB driver; and
each time period of a plurality of time periods comprises each USB frame of a plurality of USB frames.

21. A system to communicate data over an external bus, comprising:
a processor;
a memory, coupled to the processor, to store a plurality of instructions to be executed by said processor;
an external bus port; and
an external bus controller, coupled to said processor and said external bus port, said external bus controller including a first register interface to receive a first set of data and a second register interface to receive a second set of data; said external bus controller to send the first set of data and the second set of data to said external bus port;
said external bus controller to send to said external bus port up to a first amount of data within each time period of a plurality of time periods, each up to a first amount of data to be received from the first register interface; and
said external bus controller to send to said external bus port at least a second amount of data within each time period of the plurality of time periods, each at least a second amount of data to be received from the second register interface.

22. The system of claim 21, wherein:
said external bus port comprises a shared external bus port; and
said external bus controller comprises a shared external bus controller.

23. The system of claim 22, further comprising:
a debug console to execute debug console debug software;
said external bus port to send each at least a second amount of data to said debug console; and
said processor executing system under test debug software.

24. The system of claim 22, further comprising:
a debug console to execute debug console debug software;
a debug peripheral;
said external bus port to send each at least a second amount of data to said debug peripheral;
said debug peripheral to send each at least second amount of data to said debug console; and
said processor executing system under test debug software.

25. The system of claim 22, wherein
said external bus controller includes a Universal Serial Bus ("USB") host controller;
said external bus port comprises a first USB host port;
said debug peripheral includes at least a first USB target port and a second USB target port; and
said debug console includes a second USB host port.

* * * * *